UNITED STATES PATENT OFFICE.

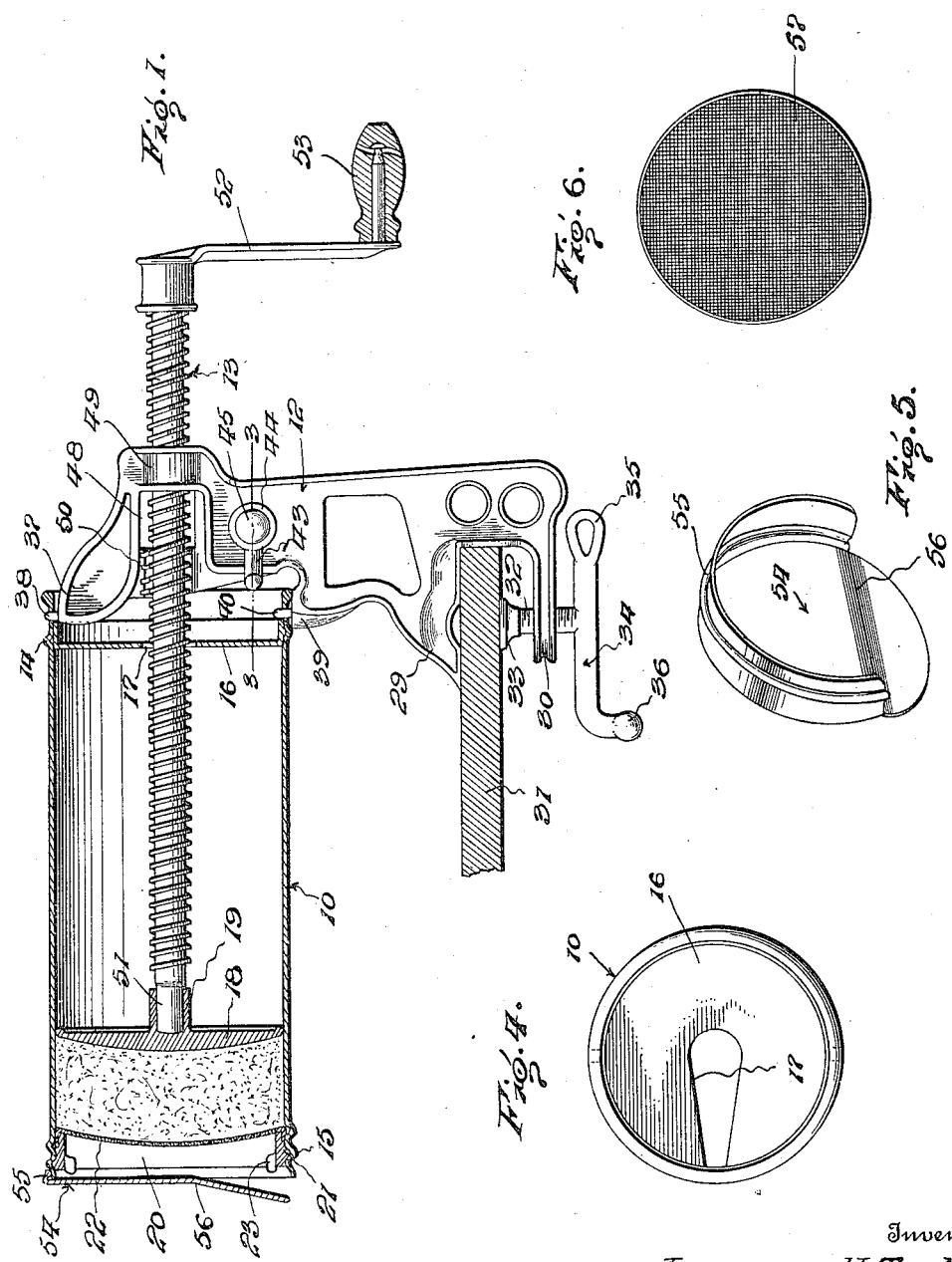

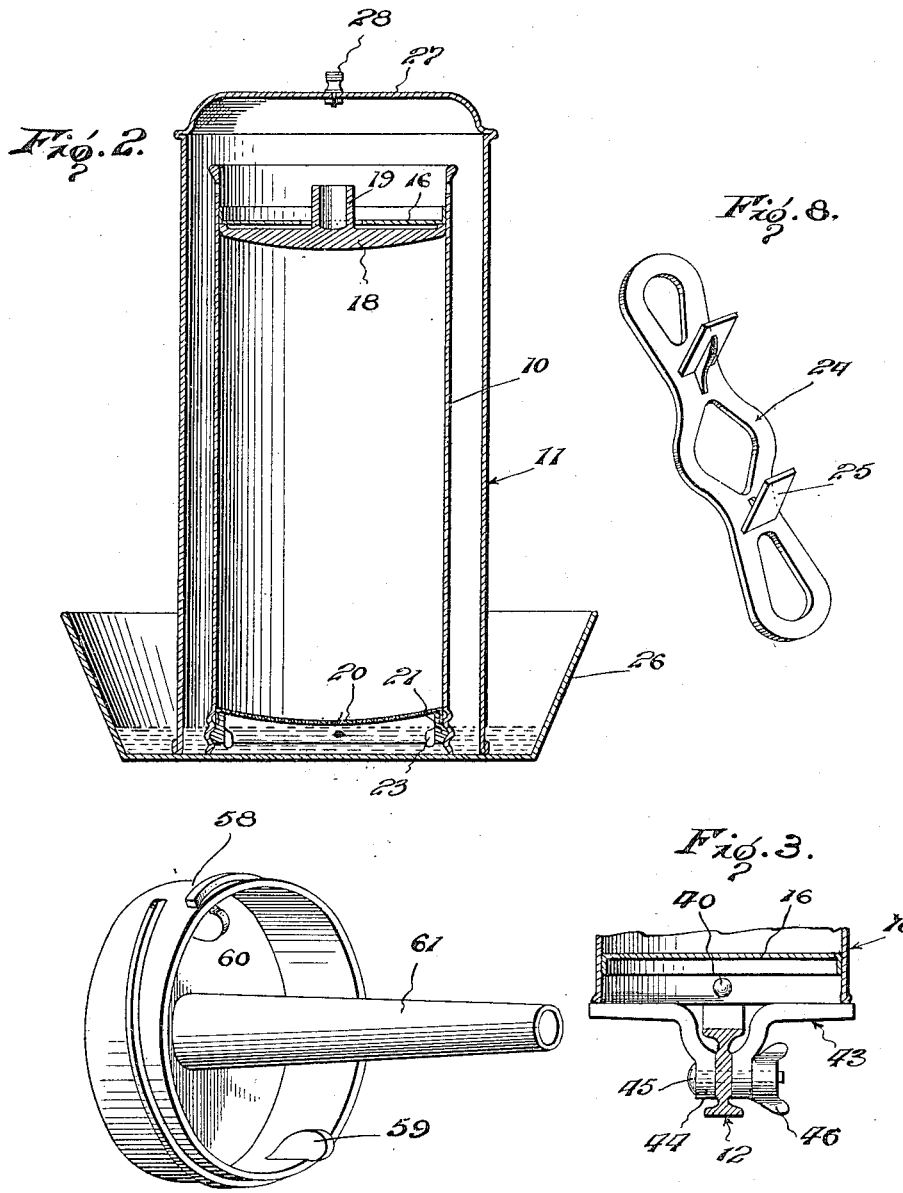

LAWRENCE H. TAYLOR, OF WICHITA, KANSAS.

DOMESTIC PRESS.

1,223,642.  Specification of Letters Patent.  Patented Apr. 24, 1917.

Application filed May 23, 1916. Serial No. 99,389.

*To all whom it may concern:*

Be it known that I, LAWRENCE H. TAYLOR, a citizen of the United States, residing at Wichita, in the county of Sedgwick and State of Kansas, have invented certain new and useful Improvements in Domestic Presses, of which the following is a specification.

My invention relates to new and useful improvements in culinary utensils, the primary object of my invention being the provision of a combined press and steam cooker of such a character that vegetables or other food products to be cooked and pressed may be positioned in the body or cylinder of the press and held therein while being cooked and of such a character that the said cylinder may be then applied to a suitable follower carrying bracket and the follower forced into the cylinder to either press the contents into one end of the cylinder or to express the contents therefrom, as desired.

In this connection, a still further object of my invention consists in providing a combined press and cooker of the above described character in which, in use, one end of the food containing cylinder is closed by the follower and the other end by a sieve or its equivalent and in providing a cover in the form of a cylinder closed at one end adapted to engage in spaced relation about the food holding cylinder so that the two may be positioned with their ends in water contained in a suitable receptacle, whereby the food contained in the inner cylinder or press proper may be steam cooked.

A still further object of my invention consists in the provision of a novel means for securing a strainer or strainers in the discharge end of the press cylinder, said means also being applicable for securing a filling spout in the cylinder in order that the device may be utilized for stuffing sausages.

In this connection, a still further object of my invention consists in the provision of a novel form of deflector removably applicable to the discharge end of the press cylinder to prevent squirting or spattering of liquid from the cylinder when the device is in use.

My present invention also comprehends certain features in the construction of a supporting bracket for the press and follower screw, one object which I have in view being the provision of a bracket which will afford a suitable suspension for the cylinder and which also carries an adjustable clamping member for locking the cylinder against movement when in place.

Another object which I have in view is the provision of a combined thumb and crank screw for clamping the bracket to a table or other support.

With these and other objects in view, my invention will be more fully described, illustrated in the accompanying drawings, and then specifically pointed out in the claims which are attached to and form a part of this application.

In the drawings:

Figure 1 is a side elevation of my invention employed as a press, the press cylinder itself being shown in longitudinal section;

Fig. 2 is a central vertical sectional view, showing the manner of employing the press cylinder as a part of the steam cooker;

Fig. 3 is a fragmentary horizontal sectional view taken on the line 3—3 of Fig. 1, illustrating the cylinder engaging clamp;

Fig. 4 is an end view of the bracket engaging end of the cylinder;

Fig. 5 is a perspective view of the deflector employed at the discharge end of the cylinder;

Fig. 6 illustrates an auxiliary sieve or strainer which may be employed with my press;

Fig. 7 is a perspective view of a sausage filling attachment applicable to the press;

Fig. 8 is a perspective view of a type of spanner wrench employed in threading either the strainer or sausage filler into the end of the press cylinder.

Corresponding and like parts are referred to in the following description and indicated in all the views of the drawings by the same reference characters.

My invention broadly includes a food product holding container or cylinder 10 which forms the press cylinder and which may coöperate with a cover 11, as shown in Fig. 2, to provide a steam cooker or with a bracket 12 and press screw 13, as shown in Fig. 1, to operate as a press for pressing meat, vegetables or the like.

The cylinder 10 or body of the press is preferably formed of relatively heavy sheet metal provided at one end with external reinforcing beads 14 and having its opposite end pressed to provide a threaded portion 15 having both internal and external threads. The unthreaded end of the cylinder is closed by a wall 16 which is spaced slightly from such end and which is formed with a slot 17 through which the press screw 13 may extend. Reciprocally mounted within the cylinder 10 is a follower 18 having a slightly convex face directed toward the discharge end of the cylinder, which is the threaded end, and provided at its rear face with a hollow bearing forming socket 19 which in innermost position of the follower projects through the slot 17. This follower, while fitting with reasonable snugness within the cylinder, is loose enough to permit passage of steam, for a reason which will be later apparent.

The discharge end of the cylinder receives, in ordinary use, a ring 20 having external threads 21 engaging within the inner threads of the cylinder and this ring, at its inner edge, carries a screen or strainer 22 having relatively large discharge passages. The body of the ring is provided interiorly with radially extending lugs 23 which also project somewhat beyond the outer face of the ring, as clearly shown in Fig. 1. To faciltate the application of this strainer carrying ring, I provide a spanner wrench 24, best shown in Fig. 8. This wrench includes a body somewhat greater in length than the diameter of the cylinder 10 and having inwardly extending arms 25 adapted to seat snugly within the ring and to engage the lugs or shoulders 23, whereby the ring may be turned so as to be threaded into or out of the cylinder by proper swinging of the wrench.

The above described parts of my invention are common to the device both when it is utilized as a steam cooker and when it is utilized as a press. For instance, when utilized as a steam cooker, the screen or sieve carrying ring 20 is removed, the follower 18 is moved to the inner end of the cylinder to bear against the wall 16, the cylinder is filled or partially filled with any food product to be steam cooked and pressed, and the cylinder and its ring 22 are then replaced. The cylinder thus filled with the food to be cooked is then positioned in an open receptacle 26 partially filled with water, that end of the cylinder closed by the strainer 22 being immersed in the water contained in the vessel 26. The cylindrical cover 11 is then positioned about the food containing cylinder 10 with its open end resting upon the bottom of the water containing receptacle 26 and with its closed end 27 spaced above the upper end of the inner cylinder 10. Preferably, this cover is provided with a handle 28 by means of which it may be readily removed. Obviously, when the water contained in the receptacle 26 is brought to the boiling point, steam generated in this manner will pass through the strainer 22, through the food contained in the inner cylinder 10 and past the follower through the slot 17 of the plate closing the end of the cylinder 10 into the space between the cylinder and cover 11. As the steam pressure in this cover increases, the cover will either be raised or somewhat tilted by the pressure of steam and will permit the steam to pass beneath its lower open end through the water contained in the receptacle 26. By this means, I provide a steam cooker in which the food is cooked by steam under pressure and in which all escaping steam is forced through a body of water which absorbs the greater portion of the odors given off by the food being cooked. After the food contained within the cylinder has been sufficiently cooked, the cover 11 is removed and the cylinder 10 and its food removed from the vessel 26 and applied to the bracket, in a manner which will be later explained in order that the contents of the cylinder may either be pressed into its discharge end or expressed from the cylinder through the strainer, as intended.

Referring again to Fig. 1, it will be seen that the bracket 12, which is preferably cast in a single piece, includes spaced jaws 29 and 30 adapted to engage above and below the edge portion of a table 31 or other suitable support and that the bracket is attachable to such table by a clamping screw 32 threaded through the lower arm 30 of the bracket and having a swivelly connected clamping head 33 engageable with the lower face of the table. The opposite end of the clamping screw 32 is formed with a cross bar 34 having a thumb piece or enlargement 35 at one end and a downwardly depending hand crank 36 at its opposite end. When the bracket is being positioned upon the table, it is moved to bring its jaws above and below the table and the clamping screw 32 is first rotated rapidly by means of the crank handle 36 until the clamping head thereof is brought in engagement with the table. After this, the entire cross bar, with its enlargement 35 and crank handle 36, may be employed as a thumb screw for further tightening or clamping the bracket in place. The upper end of the bracket is formed with a projecting nose 37 having an upstanding trunnion 38 and the bracket, intermediate its height, is formed with a forwardly directed arm 39 having an upstanding trunnion 40 in vertical alinement with the trunnion 38. The cylinder 10 is provided between its rear end and the wall 16 with diametrically formed openings to seat over the trunnions 38 and 40. Obviously, the cylinder, when applied to the bracket in the manner shown in Fig. 1, will be held against any movement other than swinging and vertical movement because of engagement with the trunnions, the latter movement, as will be later apparent, being prevented by the press screw 13. To prevent this swinging movement, I provide the bracket with a supplemental and adjustable clamp to take up any wear or lost motion between the bracket and cylinder. This clamp, as best shown in Fig. 3, includes a pair of substantially L-shaped bodies 43, one arm of each of which is formed with an eye 44 to receive a clamping bolt 45 which is passed through the eyes of both bodies and through the bracket 12 and which receives a winged clamping screw 46 by means of which the clamp bodies 43 may be secured to the bracket in adjusted position. The opposite arms of the clamp bodies 43 project in such a manner that by angular adjustment of the eye carrying arms, they may be swung into more or less close engagement with the peripheral edge of the cylinder to prevent any possible lateral swinging of the cylinder and also to hold it in a forward position with respect to the bracket.

The bracket, in axial alinement with the cylinder 10, is formed centrally with an opening 48 and at the opposite sides of this opening with opposed semi-cylindrical bearings 49 which are internally threaded, as shown at 50, to mesh with the threads of the press screw 13. This press screw is formed with an unthreaded terminal 51 adapted to fit within the socket 19 of the follower 18 and at its opposite end is provided with a crank arm 52 having a handle 53. After food has been cooked in the cylinder 10, the cylinder is mounted upon the bracket in the manner clearly shown in Fig. 1, the socket of its follower, at that time, projecting through the slot 17 of the wall 16. The unthreaded end of the press screw 13 is then passed diametrically through the opening 48 and centered in the socket 19 of the follower when the screw is swung into axial alinement with the cylinder to engage the threads of the nut or bearing members 49. The screw may now be turned by means of the handle 53 and through its engagement with the threads 50 to force the follower 18 through the strainer 22 or discharge end of the cylinder. This movement of the follower will, of course, press the contents of the cylinder against the strainer and either compress such contents, if the food be of a firm nature, such as meat, to extract the juice and liquids therefrom, or will force the food through the interstices of the strainer in a relatively finely divided condition, if the food be of a softer nature, such as potatoes or other vegetables. In either instance, the discharge end of the cylinder is preferably partially closed by a deflector 54 in the form of a disk of sheet metal provided throughout substantially three-quarters of its periphery with a threaded flange 55 for engagement with the external threads of the end of the cylinder and having its unflanged portion bent outwardly at an angle, as shown at 56, to space such unflanged portion from the end of the cylinder. The threads are so formed upon the flange 55 that when the deflector is in place, with its threads firmly engaging those of the cylinder, the outwardly bent portion of the deflector will be located at the bottom portion of the cylinder so as to deflect any liquid, juice or food passing through the strainer downwardly into any suitable receptacle which may be properly positioned beneath the discharge end of the cylinder. This deflector will obviously prevent any squirting or spattering of liquids or juices from the food being pressed. If the food to be pressed is of such a nature that it should be pressed through a strainer finer than that shown at 22, a supplemental strainer or sieve 57 of relatively fine mesh may be employed, being located adjacent the inner face of the strainer 22 and supported thereby when in use.

My improved press may also be utilized as a sausage filling press or machine by removing the strainer ring 20 and deflector plate and substituting therefor the attachment shown in Fig. 7. This attachment includes a supporting ring 58 threaded to seat in the discharge end of the cylinder and provided with inwardly projecting radial lugs 59 by means of which it may be turned in place by the wrench 24. This ring, at its inner end, however, is closed, as shown at 60, save for a central opening surrounded by a frusto-conical or tapered discharge spout 61 through which the filling material for the sausage may be pressed in a manner which will be well understood.

It will, of course, be understood that various minor changes may be made and that my press may be utilized not only for cooking but for pressing food products of vastly different natures. For this reason I do not wish to limit myself in any way to the specific features of construction or the specific uses described, but reserve the right to make any changes, both in construction and use, within the scope of the appended claims.

Having thus described the invention, what is claimed as new is:

1. In a culinary device, a bracket having a plurality of vertically extending trunnions, a food holding receptacle adapted to be mounted upon the bracket through engagement with the trunnions, clamps adjustable upon the bracket and movable into and out of engagement with one end of the receptacle to prevent movement of the receptacle with respect to the bracket, a follower movable within the receptacle, and a press screw threaded through the bracket and engaging the follower to actuate it.

2. In a culinary device, a food holding receptacle open at one end, such end being pressed to provide an external screw thread and a resultant internal screw thread, a strainer carrying ring threaded within such end of the receptacle, a deflector carrying ring threaded about such end of the receptacle, a follower mounted in the receptacle, a bracket for supporting the receptacle, and a press screw threaded through the bracket and operatively engaging the follower.

3. In a culinary device, a food holding receptacle having a closure in spaced relation to one end, the end exterior of the closure being formed with diametrically disposed openings, a bracket having alined trunnions to seat in the openings, a follower in the receptacle, a press screw threaded in the bracket and co-acting with the follower, and clamps carried by the bracket and engageable with the trunnion receiving end of the receptacle at opposite sides to hold the receptacle against swinging movement.

4. In a culinary device, a bracket having a plurality of vertically extending trunnions, a food holding receptacle adapted to be mounted upon the bracket through engagement with the trunnions, clamps swingingly mounted upon opposite sides of the bracket and movable into engagement with the receptacle to hold it against swinging movement, and means for securing the clamps in adjusted position.

5. In a culinary device, a bracket having a plurality of vertically extending trunnions, a food holding receptacle adapted to be mounted upon the bracket through engagement with the trunnions, clamps swingingly mounted upon opposite sides of the bracket and movable into engagement with the receptacle to hold it against swinging movement, and means for securing the clamps in adjusted position, said means including a clamping bolt passed through the clamps and bracket to support the clamps upon the bracket, and a clamping nut threaded upon the bolt.

In testimony whereof I affix my signature.

LAWRENCE H. TAYLOR. [L. S.]

Copies of this patent may be obtained for five cents each, by addressing the "Commissioner of Patents, Washington, D. C."